United States Patent [19]

Jones

[11] 4,108,246
[45] Aug. 22, 1978

[54] CONVERTER TYPE SCALE REMOVER

[75] Inventor: Loyd W. Jones, Tulsa, Okla.

[73] Assignee: Standard Oil Company (Indiana), Chicago, Ill.

[21] Appl. No.: 770,728

[22] Filed: Feb. 22, 1977

[51] Int. Cl.² .................. E21B 43/27; E21B 43/28
[52] U.S. Cl. .................. 166/312; 166/307; 252/8.55 B
[58] Field of Search ............. 166/300, 305 R, 307, 166/311, 312; 252/8.55 B, 8.55 E

[56] References Cited
U.S. PATENT DOCUMENTS

| | | | |
|---|---|---|---|
| 2,386,605 | 10/1945 | Harton, Jr. ................ | 166/312 X |
| 2,396,938 | 3/1946 | Bersworth ................ | 252/180 X |
| 2,679,294 | 5/1954 | Bond et al. ............... | 166/307 X |
| 2,787,326 | 4/1957 | Hughes .................... | 252/8.55 B X |
| 3,170,815 | 2/1965 | White ...................... | 166/307 X |
| 3,283,816 | 11/1966 | Bradley ................... | 166/307 |
| 3,547,194 | 12/1970 | Morine .................... | 166/307 X |
| 3,688,829 | 9/1972 | Jones ...................... | 166/305 R |

Primary Examiner—Stephen J. Novosad
Assistant Examiner—George A. Suchfield
Attorney, Agent, or Firm—Robert B. Stevenson; Arthur McIlroy

[57] ABSTRACT

A process and composition are described for use in removing calcium sulfate scale from a well. An aqueous converter solution of sodium (or potassium or possibly ammonium) gluconates, hydroxides, and carbonates is used to convert the calcium sulfate into an acid soluble form, which can be removed by an acid rinse. In the aqueous converter solution, the weight ratio of hydroxide to carbonate is between about 3:2 and about 5:1, and the weight ratio of gluconate to the total amount of hydroxide and carbonate is between about 2:1 and about 5:1. The concentration of the combination of gluconate, hydroxide, and carbonate is between about 15% and about 50%. Preferably, the solution is by weight approximately 25% sodium gluconate, 5.3% sodium hydroxide, 1.8% sodium carbonate, and the remainder water.

6 Claims, 3 Drawing Figures

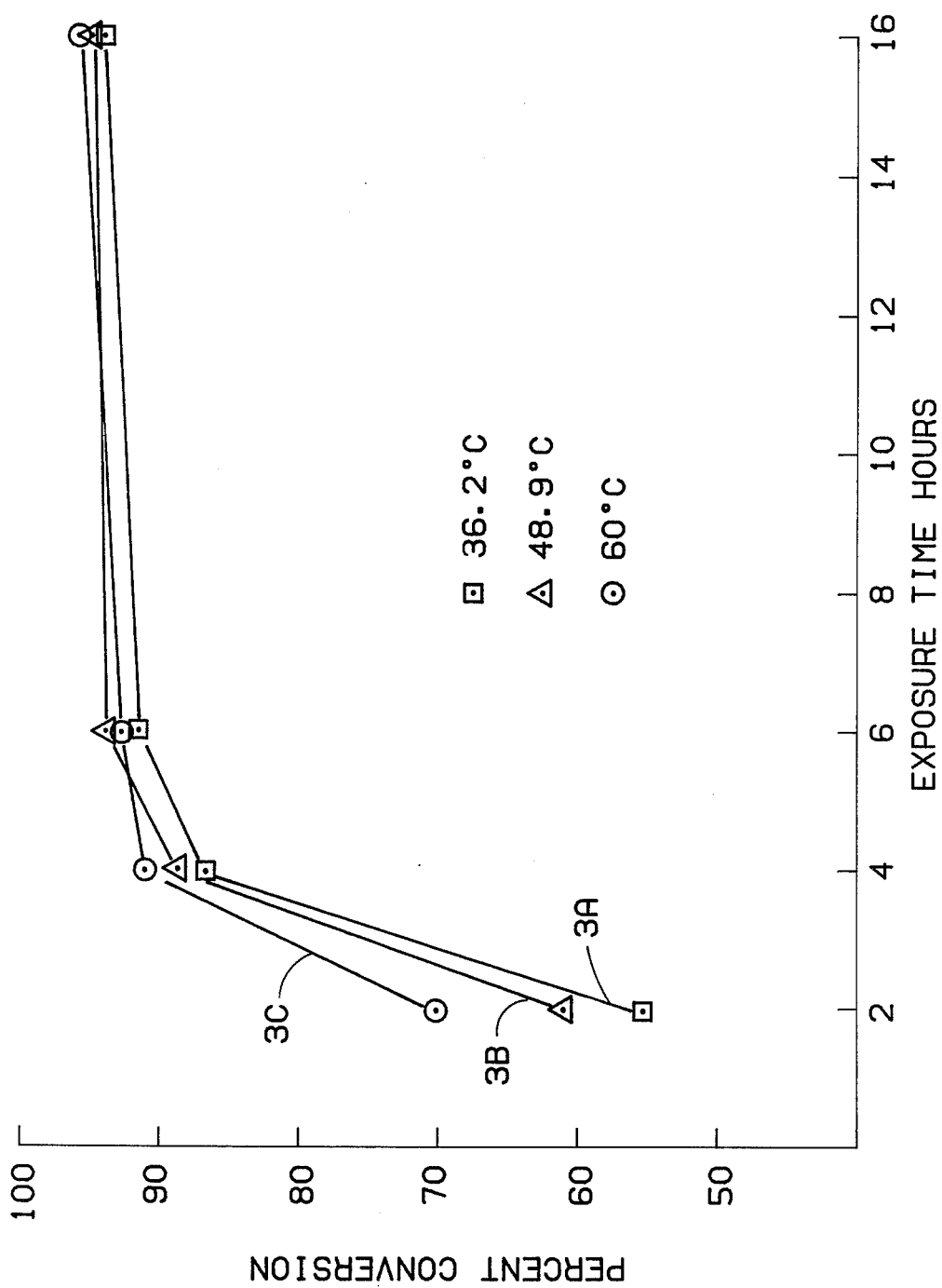

CONVERTER TYPE SCALE REMOVER

BACKGROUND OF THE INVENTION

This invention relates to cleaning of calcium sulfate scale from wells and particularly to cleaning by conversion of the calcium sulfate scale to an acid soluble form.

When the producing rate of an oil or gas well, for example, declines, a workover job is generally performed to increase production. The workover may include bailing out of accumulated scale and other solids, acidizing, fracturing, use of paraffin solvents, or scale solvents, and the like. Removal of calcium sulfate scale from wells has presented problems, particularly when the scale is in a massive, dense, impermeable form, or when the scale is deposited in pores or other openings within the formation.

In some instances, direct solvents for calcium sulfate (or gypsum) have been used. In U.S. Pat. No. 2,396,938, Bersworth suggests the use of ethylene diamine tetracetic acid, but its use in oil wells has been limited by its cost and relatively low effectiveness. In hydrocarbon producing wells, the chemicals are usually much less expensive ones such as hydroxy acetic acid (glycolic acid), as mentioned in U.S. Pat. No. 3,547,194, by Morine, or simply sodium hydroxide.

In U.S. Pat. No. 3,688,829, I described a direct solvent for calcium sulfate scale containing generally the same gluconates and hydroxides as described herein, and in somewhat similar proportions, but without any carbonate as described herein. The direct solvent solution of my prior patent has been sold under the trademark "C-Dex".

In other prior art techniques, converters have been used. In U.S. Pat. No. 2,787,326, Hughes discloses several converter solutions, including sodium and potassium carbonates (it is to be noted, however, that wellbore deposits of these carbonates do not occur naturally). After such a conversion reaction is completed, Hughes' water-insoluble reaction product (calcium carbonate) is treated according to known acidizing techniques (a 10-30% acid solution is introduced into the wellbore, following which the well is flushed to remove residual acid, reaction products, and particles of scale loosened by the reactions).

Even in the case where direct solvent solutions are used, a follow-up acid treatment is often performed to remove scale of types other than calcium sulfate, especially calcium carbonate and iron sulfide scales.

In the past, either the direct solvent or the converter techniques have generally required extensive soaking times, and while occasionally a well with little scale might be treated in as little as four hours, it has become more or less standard practice to maintain the solvent or converter in the wellbore for about 24 hours. As lost production costs can often be $10,000 or more per day, the cost of such 24-hour soaking times can be quite significant.

SUMMARY OF THE INVENTION

This invention concerns a process and composition for removing calcium sulfate scale from a well (the wellbore and the adjacent formation) using a fast-acting aqueous converter solution of sodium or potassium or ammonium gluconates, hydroxides, and carbonates to convert the calcium sulfate into compounds, which can be readily removed by an acid. As this converter solution works at least about twice as fast as prior solutions (either converter or direct solvent), the solution generally need be maintained in the well for only about 4-12 hours and the lost production costs can be significantly reduced.

The aqueous converter solution has a weight ratio of hydroxide to carbonate of between about 3:2 and about 5:1 and has a weight ratio of gluconate to combined hydroxide and carbonate of between about 2:1 and about 5:1. The concentration of the combination of gluconate, hydroxide, and carbonate is between about 15% and 50% by weight of the aqueous solution introduced into the wellbore.

The introduction of this relatively small amount of carbonate dramatically changes the reaction from the direct solvent action generally described in my prior patent to a converter reaction which must be followed by an acid rinse in order to remove the scale.

BRIEF DESCRIPTION OF OF THE DRAWINGS

This invention will be further described by reference to the following drawings in which:

FIG. 3 is a graph of percentage conversion of a preferred composition with various temperatures and exposure times.

DESCRIPTION OF THE PREFERRED DRAWINGS

This process generally removes a scale containing calcium sulfate from a well by introducing the aqueous solution of the composition described herein into the well to convert at least a substantial portion of the calcium sulfate to a reaction product (an acid-soluble fluffy complex apparently containing calcium carbonate, gluconate, and hydroxide) and then contacting this reaction product with a 10-30% acid solution to dissolve the reaction product. This converter composition is an aqueous solution of gluconate, hydroxide, and carbonate compounds. The cations of these compounds are selected from the group consisting of sodium, potassium and the ammonium ion. Preferably the weight ratio of hydroxide to carbonate is between about 3:1 to about 5:1, and the weight ratio of gluconate to total hydroxide and carbonate is between 3:2 and 4:1. The concentration of the compounds (gluconates, hydroxides, and carbonates) is about 15-50% of the aqueous solution (all composition figures hereinafter are in percent by weight). As the potassium compounds are more expensive, the sodium compounds (sodium gluconate, sodium hydroxide, and sodium carbonate) are preferred. While ammonium compounds can also be used, tests have shown that ammonium carbonate, for example, used in the same proportions as the sodium carbonate or potassium carbonate, is somewhat less effective.

In order to evaluate the effects of varying the constituents of the compositions of this invention, a relatively extensive set of tests was run. In each of these tests, 10 grams of crushed calcium sulfate scale (between 10 and 20 screen size) was placed in 100 ml of the aqueous solution and held at 100° F. (37.8° C) for a predetermined reaction time (either 4 or 24 hours). The solids were then filtered out and treated with 100 ml of 15% hydrochloric acid. The remaining solids were then rinsed, dried, and weighed. This weight was then subtracted from the original 10 grams of scale to determine the amount of scale which was converted (and then dissolved).

As compared to a "C-Dex" formulation of my former patent (typically 15% sodium gluconate, 5% sodium hydroxide, and the remainder water), an aqueous converter solution containing 15% sodium gluconate, 6% sodium hydroxide, and 2% sodium carbonate followed by an an acid rinse dissolved about 36% more scale than "C-Dex" alone after a 24-hour soak period. Compared to the same "C-Dex" formulation, another aqueous converter formulation containing 15% sodium gluconate, 5% caustic, and 2% sodium carbonate followed by an acid rinse dissolved approximately 34% more scale. It might be noted that the results with "C-Dex" in these tests were not quite as good as earlier tests (see data in my patent). This was probably due to variation in nature of the scale.

Figure 1:
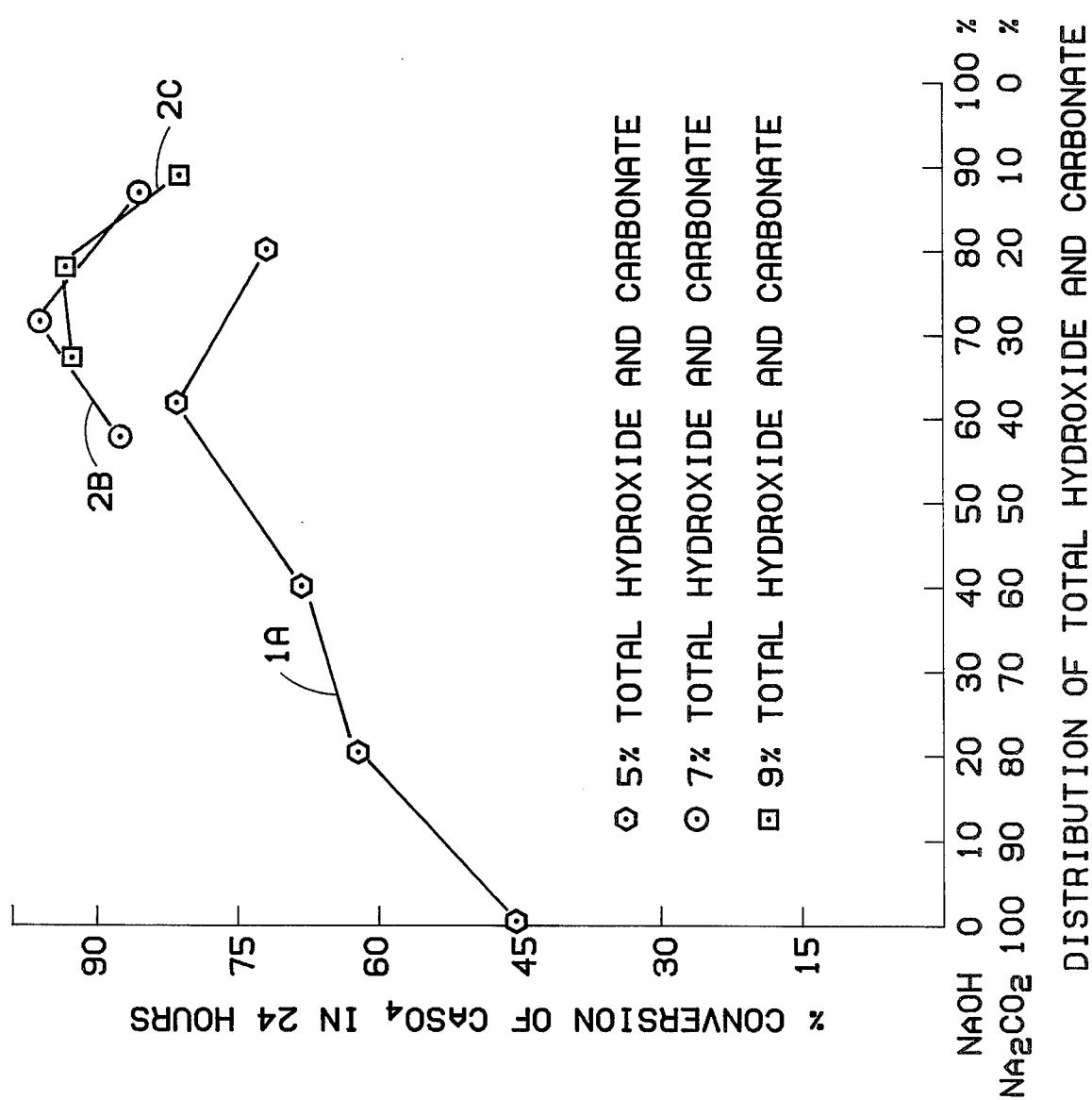
FIG. 1 is a graph showing the percentage of calcium sulfate converted to an acid soluble form in 24 hours using a relatively small amount of gluconate and of varying the proportions of hydroxide and carbonate.

FIG. 1 shows the percentage of calcium sulfate scale converted in 24 hours, using 15% of the aqueous solution of sodium gluconate and varying the amount of sodium hydroxide and sodium carbonate. The highest point on any of the curves of FIG. 1 is the aforementioned formulation with 15% sodium gluconate, 5% sodium hydroxide, and 2% sodium carbonate (thus, 7% total hydroxide and carbonate with about 71% of the total hydroxide and carbonate being sodium hydroxide).

In FIG. 1, the 1A curve represents a total hydroxide and carbonate content of 5% and thus, the point at 80% on the 1A curve is for a formulation with 15% sodium gluconate, 4% sodium hydroxide, and 1% sodium carbonate and indicates that with this formulation a little over 70% of the calcium sulfate was converted in 24 hours. The 1B curve is based on a total hydroxide and carbonate content of 7%, and the 1C curve is based on a total hydroxide and carbonate content of 9%. Thus, it can be seen that for this amount of gluconate (15%) optimum total hydroxide and carbonate content is more than 5% and less than 9% and that the amount of sodium hydroxide should probably be between 60% and 80% of the combined hydroxide and carbonate portion.

Subsequent testing indicated that the 15% sodium gluconate was less than optimum for most rapid conversion and that reaction time could be substantially reduced when the amount of gluconate was increased.

Figure 2:
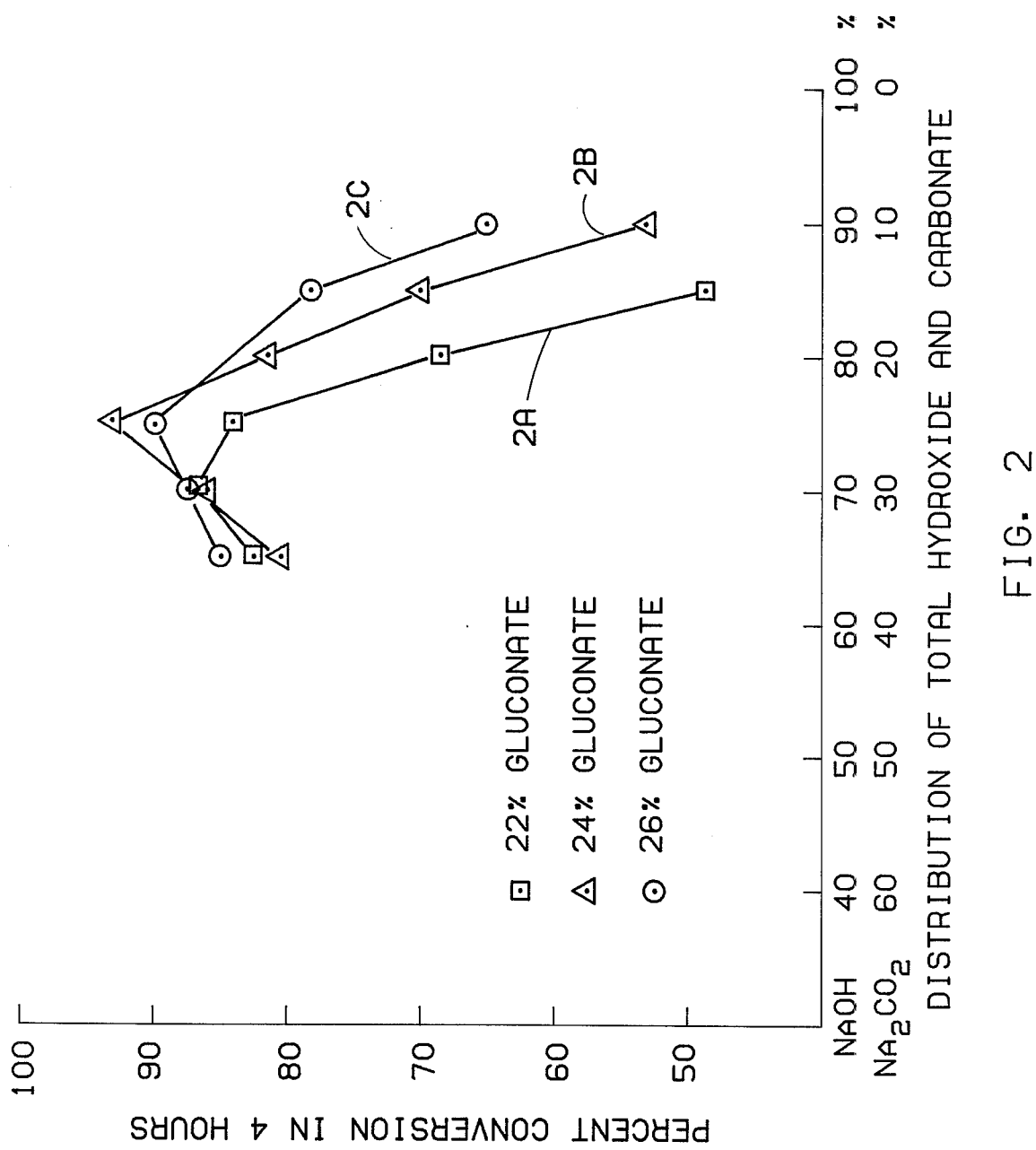
FIG. 2 is a graph of percentage conversion in 4 hours using substantially more gluconate and varying proportions of hydroxide and carbonate.

FIG. 2 shows the results of a test which was run with significantly more gluconate for 4 hours (instead of 24 hours). In these tests the combined hydroxide plus carbonate content was maintained at 7% (the ratio of hydroxide and carbonate was, of course, varied to give the different points on each of the curves). The 2A curve is for 22% sodium gluconate, the 2B curve is for 24% sodium gluconate, and the 2C curve is for 26% sodium gluconate. Comparison of this data with 4-hour tests run with 15% gluconate indicated that increasing the amount of gluconate from 15% to 26% provides about a 34% increase in the amount of calcium sulfate scale converted in 4 hours. Thus, the aqueous solution should contain about 22-26% sodium gluconate, 3-6% sodium hydroxide, and 1-4% sodium carbonate. For these concentrations of gluconate, the optimum proportions of gluconate to hydroxide to carbonate are about 14:3:1.

FIG. 3 shows the percentage conversion as a function of the exposure time and of temperature, using solutions containing 26% sodium gluconate, 5.25% sodium hydroxide, and 1.75% sodium carbonate. Curve 3A is for a temperature of 97° F. (36.2° C.), Curve 3B is for a temperature of 120° F. (48.9° C.), and Curve 3C is for a temperature of 140° F. (60° C.). It can be seen that at 140° F. there is fairly good conversion even in 2 hours, but that at all three temperatures good conversion is obtained in 4 to 6 hours. As most boreholes have elevated bottom-hole temperatures, maintaining the solution in the borehole for between 4 and 6 hours should be adequate even for wells with extensive calcium sulfate scale deposits.

From the foregoing, it can be seen that the compositions described herein provide for quite rapid scale conversion. The optimum removal appears to be with combined gluconate, hydroxide, and carbonate concentrations of between 30% and 35%. Concentrations of as little as 15% can be used in wells with light scale. In wells with heavy scale, total concentrations of up to about 50% can be used, especially as this allows for some dilution by formation water.

Treatment of various types of acids are known in the art and are generally used in about 10-30% aqueous acid solutions. While sulfamic acid or acetic acid will work, the most commonly used acid solution is hydrochloric, and it has been found to be the most convenient and is preferred.

The invention is not to be construed as limited to the particular forms disclosed herein, since these are to be regarded as illustrative rather than restrictive. The invention is intended to cover all compositions and processes which do not depart from the spirit and scope of the invention.

I claim:
1. A process for removing scale containing calcium sulfate from a well, said process comprising:
    (a) introducing into said well an aqueous solution of a gluconate, hydroxide, and carbonate compounds, the cations of said compounds being selected from the group consisting of sodium, potassium, and ammonium, the weight ratio of hydroxide to carbonate being between the number 3:2 to about 5:1, the weight ratio of gluconate to combined hydroxide and carbonate being between 2:1 to about 5:1, the concentration of the combination of gluconate, hydroxide and carbonate being between about 15% and 50% by weight, to convert at least a substantial proportion of said calcium sulfate to an acid-soluble reaction product; and thereafter
    (b) contacting said reaction product with an aqueous acid solution thereby removing said acid-soluble reaction product.

2. The process of claim 1, wherein said gluconate, hydroxide, and carbonate compounds are sodium gluconate, sodium hydroxide, and sodium carbonate.

3. The process of claim 2, wherein said solution of gluconate, hydroxide, and carbonate compounds is maintained in said well for between two and 24 hours.

4. The process of claim 3, wherein said solution of gluconate, hydroxide, and carbonate compounds is maintained in said well for between about 4 and 6 hours.

5. The process of claim 2, wherein the gluconate to hydroxide to carbonate proportions are about 14:3:1 by weight.

6. The process of claim 5, wherein the acid employed is hydrochloric acid.

* * * * *